(12) United States Patent
Kikuchi

(10) Patent No.: US 8,588,180 B2
(45) Date of Patent: Nov. 19, 2013

(54) MOBILE COMMUNICATION SYSTEM, MOBILE STATION, BASE STATION, AND HANDOVER CONTROLLING METHOD

(75) Inventor: Tsuneyuki Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 375 days.

(21) Appl. No.: 12/989,234

(22) PCT Filed: Mar. 12, 2009

(86) PCT No.: PCT/JP2009/054750
§ 371 (c)(1),
(2), (4) Date: Oct. 22, 2010

(87) PCT Pub. No.: WO2009/142054
PCT Pub. Date: Nov. 26, 2009

(65) Prior Publication Data
US 2011/0032815 A1    Feb. 10, 2011

(30) Foreign Application Priority Data

May 19, 2008    (JP) .................................. 2008-130539

(51) Int. Cl.
*H04W 80/04*    (2009.01)
(52) U.S. Cl.
USPC ......................................... 370/331; 455/436
(58) Field of Classification Search
USPC .................... 370/331, 338, 455, 536
See application file for complete search history.

(56) References Cited

U.S. PATENT DOCUMENTS

| | | | |
|---|---|---|---|
| 2002/0160777 A1* | 10/2002 | Takao et al. | 455/436 |
| 2009/0047960 A1* | 2/2009 | Gunnarsson et al. | 455/436 |
| 2009/0238116 A1* | 9/2009 | Chaponniere et al. | 370/328 |
| 2009/0305704 A1* | 12/2009 | Kato et al. | 455/437 |
| 2010/0311322 A1* | 12/2010 | Bao et al. | 455/9 |
| 2010/0323662 A1* | 12/2010 | Dahlen et al. | 455/410 |

FOREIGN PATENT DOCUMENTS

| | | |
|---|---|---|
| CN | 1370021 A | 9/2002 |
| CN | 1930794 A | 3/2007 |
| EP | 1107630 B1 | 5/2003 |
| JP | 2000232672 A | 8/2000 |
| JP | 2001169323 A | 6/2001 |

(Continued)

OTHER PUBLICATIONS

International Search Report for PCT/JP2009/054750 mailed Jun. 9, 2009.

(Continued)

*Primary Examiner* — Gary Mui
*Assistant Examiner* — Lan Truong

(57) ABSTRACT

A mobile station measures reception quality levels of individual peripheral cells of a source cell and transmits information of the measured reception quality levels of the individual peripheral cells to a source base station that manages the source cell. The source base station selects a group of cells that are to be handed over, based on the information of reception quality levels of the individual peripheral cells that is received from the mobile station, and transmits information of handover ready completion cells that are ready for handover in the selected group of cells to the mobile station. The mobile station selects a target cell that is to be handed over, based on the information of handover ready completion cells that is received from the source base station, and on the information of reception quality levels of the individual peripheral cells at that time.

5 Claims, 5 Drawing Sheets

(56) References Cited

FOREIGN PATENT DOCUMENTS

| JP | 2002232929 A | 8/2002 |
|----|--------------|--------|
| JP | 2003032725 A | 1/2003 |
| JP | 2004128636 A | 4/2004 |
| JP | 2007527176 A | 9/2007 |

OTHER PUBLICATIONS

3GPP TS 36.300 V8.4.0, Technical Specification Group Radio Access Network; Evolved Universal Terrestrial Radio Access (E-UTRA) and Evolved Universal Terrestrial Radio Access Network (E-UTRAN); overall description; Stage 2 (Release 8), Mar. 2008.
Chinese Office Action for CN200980118198.0 dated on Jan. 16, 2013.
"3GPP TS 36.300 V8.3.0 (Dec. 2007), Technical Specification, 3rd Partnership Project; Technical Specification Group Radio Access Network; Evolved Universal Terrestrial Access (E-UTRA) and Evolved Universal Terrestrial Access Network (E-UTRAN); Overall description; Stage 2 (Release 8)", 3GPP Organizational Partners, Dec. 2007, pp. 1-121.

* cited by examiner

MOBILE COMMUNICATION SYSTEM, MOBILE STATION, BASE STATION, AND HANDOVER CONTROLLING METHOD

TECHNICAL FIELD

The present invention relates to a technique of which a mobile station performs a handover (HO) from a source cell to a target cell as the mobile station moves in a mobile communication system.

BACKGROUND ART

3GPP TS 36.300 defines a procedure of which a mobile station (UE) performs a handover from a source cell to a target cell as the mobile station moves in a mobile communication system. Hereinafter, this handover procedure will be described.

The mobile station receives pilot signals from individual peripheral cells of the source cell, measures their reception quality levels, and transmits information of the measured reception quality levels to a source base station (Source eNodeB) that manages the source cell.

When the source base station receives the information of reception quality levels of the individual peripheral cells from the mobile station, the source base station selects a group of cells that are to be handed over, based on the information of reception quality levels of the individual peripheral cells, and transmits a handover ready request message to the group of peripheral base stations that manage the selected group of cells.

In the event that the source base station receives a request positive reply message to the handover ready request message from the group of peripheral base stations, the source base station decides a target cell that is to be handed over and transmits a handover implementation directive message that directs the decided target cell to the mobile station.

When the mobile station receives the handover implementation directive message from the source base station, the mobile station establishes synchronization with a target base station (Target eNodeB) that manages the target cell directed by the handover implementation directive message and transmits to the target base station a reply message to the handover implementation directive message.

When the target base station receives the reply message to the handover implementation directive message, the target base station transmits a handover completion notification message to the source base station.

Now, the handover procedure has been completed.

If the mobile station has failed to establish the above-mentioned synchronization, the mobile station re-measures the reception quality levels of the individual peripheral cells, establishes synchronization with a target base station that manages a cell that has the highest reception quality level, and transmits to the target base station a reply message to the handover implementation directive message. Now, if the target base station that received the reply message is ready for handover, handover of the mobile station will be successful.

In the above-mentioned mobile communication system, however, there is a case that when the source base station has transmitted the handover implementation directive message, the reception quality level of the target cell directed by the handover implementation directive message will have decreased to a level such that the base station cannot perform a handover. In addition, there is a case in which, if the mobile station fails to establish synchronization, the target base station that received the reply message to the handover implementation directive message will not be ready for handover. Thus, there is a problem in which the likelihood that the mobile station succeeds in handover decreases.

Moreover, in the above-mentioned mobile communication system, if the above-mentioned establishment of synchronization fails, the connection may be delayed due to the exchanges of unnecessary signals, and an increased load may be placed on a base station that is in the state of congestion.

Non-patent document 1: 3GPP TS 36.300, V8.4.0

DISCLOSURE OF THE INVENTION

Therefore, an object of the present invention is to provide a mobile communication system, a mobile station, a base station, and a handover controlling system that solve any of the above-mentioned problems.

The mobile communication system of the present invention is a mobile communication system having a base station that manages a cell; and a mobile station that performs a handover from a source cell to a target cell as said mobile station moves, characterized in that said mobile station measures reception quality levels of individual peripheral cells of said source cell and transmits information of the measured reception quality levels of the individual peripheral cells to a source base station that manages said source cell, said source base station selects a group of cells that are to be handed over, based on the information of reception quality levels of the individual peripheral cells that is received from said mobile station, and transmits information of handover ready completion cells that are ready for handover in the selected group of cells to said mobile station, and said mobile station selects a target cell that is to be handed over, based on the information of handover ready completion cells that is received from said source base station, and on the information of reception quality levels of the individual peripheral cells at that time.

The mobile station of the present invention is a mobile station that performs a handover from a source cell to a target cell as said mobile station moves, characterized by comprising:

a handover processing unit that measures reception quality levels of individual peripheral cells of said source cell, transmits the information of the measured reception quality levels of the individual peripheral cells to a source base station that manages said source cell, and selects a target cell that is to be handed over, based on the information of handover ready completion cells that is received from said source base station, and on the information of reception quality levels of the peripheral cells at that time.

The base station of the present invention is a base station that manages a source cell when a mobile station performs a handover from said source cell to a target cell as said mobile station moves, characterized by comprising:

a handover processing unit that selects a group of cells that are to be handed over, based on information of reception quality levels of individual peripheral cells of said source cell, that is received from said mobile station, and transmits information of handover ready completion cells that are ready for handover in the selected group of cells to said mobile station.

The first handover controlling method of the present invention is a handover controlling method performed by a mobile station that performs a handover from a source cell to a target cell as said mobile station moves, characterized by comprising:

a step that measures reception quality levels of individual peripheral cells of said source cell and transmits information of the measured reception quality levels of the individual peripheral cells to a source base station that manages said source cell; and a step that selects a target cell that is to be handed over, based on the information of handover ready completion cells that is received from said source base station, and on the information of reception quality levels of the individual peripheral cells at that time.

The second handover controlling method of the present invention is a handover controlling method performed by a base station that manages a source cell when a mobile station performs a handover from said source cell to a target cell as said mobile station moves, characterized by comprising:

a first step that selects a group of cells that are to be handed over, based on information of reception quality levels of individual peripheral cells of said source cell that is received from said mobile station; and a second step that transmits information of handover ready completion cells that are ready for handover in the selected group of cells to said mobile station.

According to the present invention, when the mobile station performs a handover, the mobile station selects a target cell that is to be handed over, based on information of handover ready completion cells that is received from the source base station, and on information of reception quality levels of individual peripheral cells at that time.

Thus, since the case in which the reception quality level of the target cell, to which the mobile station is handed over, decreases to a level in which the mobile station cannot perform a handover, can be prevented from taking place, an effect, in which the likelihood is increased for successful handover of the mobile station, can be obtained.

BEST MODES FOR CARRYING OUT THE INVENTION

Hereinafter, best modes for carrying out the present invention will be described with reference to the accompanying drawings.

Figure 1:
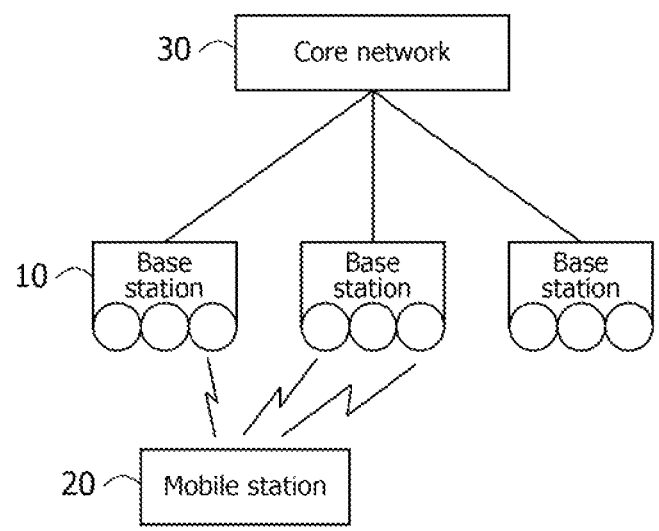
FIG. 1 is a schematic diagram showing a structure of a mobile communication system according to an exemplary embodiment of the present invention.

Referring to FIG. 1, the mobile communication system according to this exemplary embodiment has base station 10 that manages a cell, mobile station 20 that performs a handover from a source cell to a target cell as mobile station 20 moves, and core network 30. It should be noted that although three base stations 10 and one mobile station 20 are shown in FIG. 1, the present invention is not limited to such a structure.

Here, the structures of base stations 10 and mobile station 20 will be described.

First, the structure of mobile station 20 will be described with reference to FIG. 2.

Figure 2:
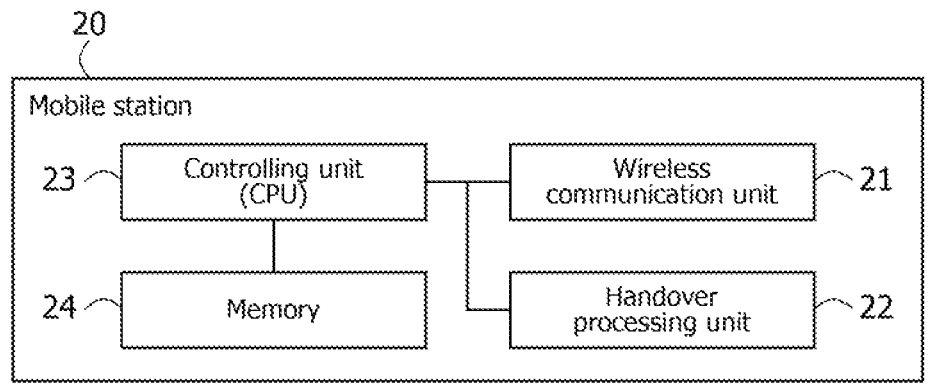
FIG. 2 is a block diagram showing a structure of a mobile station shown in FIG. 1.

Referring to FIG. 2, mobile station 20 includes wireless communication unit 21, handover processing unit 22, controlling unit (CPU) 23, and memory 24.

Wireless communication unit 21 performs a wireless communication with base station 10.

Handover processing unit 22 performs handover processes as described in (A) to (C) that follow.

(A) a process that measures reception quality levels of individual peripheral cells of the source cell and that transmits information of reception quality levels of the individual peripheral cells from wireless communication unit 21 to the source base station, (B) a process that selects a target cell that is to be handed over, based on the information of handover ready completion cells that is received from the source base station, and on the information of reception quality levels of the individual peripheral cells at that time, and (C) a process that re-selects a target cell that is to be handed over, based on the information of handover ready completion cells that is received from the source base station, and on the information of reception quality levels of the individual peripheral cells at that time or that gives up handing over and re-connects a cell that has the highest reception quality level at that time if establishment of synchronization with the target cell selected in above (A) has failed.

Controlling unit 23 controls wireless communication unit 21 and handover processing unit 22.

Memory 24 has not only functions as a working memory of controlling unit 23, but also functions as ROM that stores a controlling procedure of controlling unit 23 as a program.

Next, the structure of base station 10 will be described with reference to FIG. 3.

Figure 3:
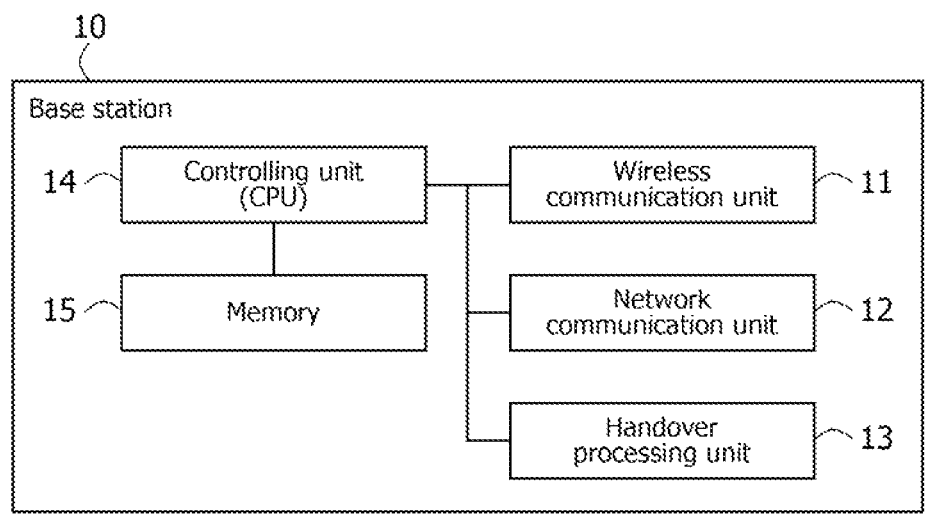
FIG. 3 is a block diagram showing a structure of a base station shown in FIG. 1.

Referring to FIG. 3, base station 10 includes wireless communication unit 11, network communication unit 12, handover processing unit 13, controlling unit (CPU) 14, and memory 15.

Wireless communication unit 11 performs a wireless communication with mobile station 20.

Network communication unit 12 performs a network communication with other base stations 10 and core network 30.

Handover processing unit 13 performs handover processes as described in (a) to (c) that follow.

(a) a process that selects a group of cells that are to be handed over, based on the information of reception quality levels of individual peripheral cells that is received from mobile station 20, and on the information of cells registered in a cell black list and that transmits a handover ready request message from network communication unit 12 to a group of peripheral base stations that manage the selected group of cells, (b) a process that creates information of handover ready completion cells based on a request positive reply message, that is received from the group of peripheral base stations, to the handover ready request message, and that transmits the information of handover ready completion cells from wireless communication unit 11 to mobile station 20, and (c) a process that registers and deletes information of cells to and from the cell black list.

Controlling unit 14 controls wireless communication unit 11, network communication unit 12, and handover processing unit 13.

Memory 15 has not only functions as a working memory of controlling unit 14, but also functions as ROM that stores a controlling procedure of controlling unit 14 as a program.

Hereinafter, the operation of the mobile communication system according to this exemplary embodiment will be described with reference to FIG. 4A and FIG. 4B.

Figure 4A:
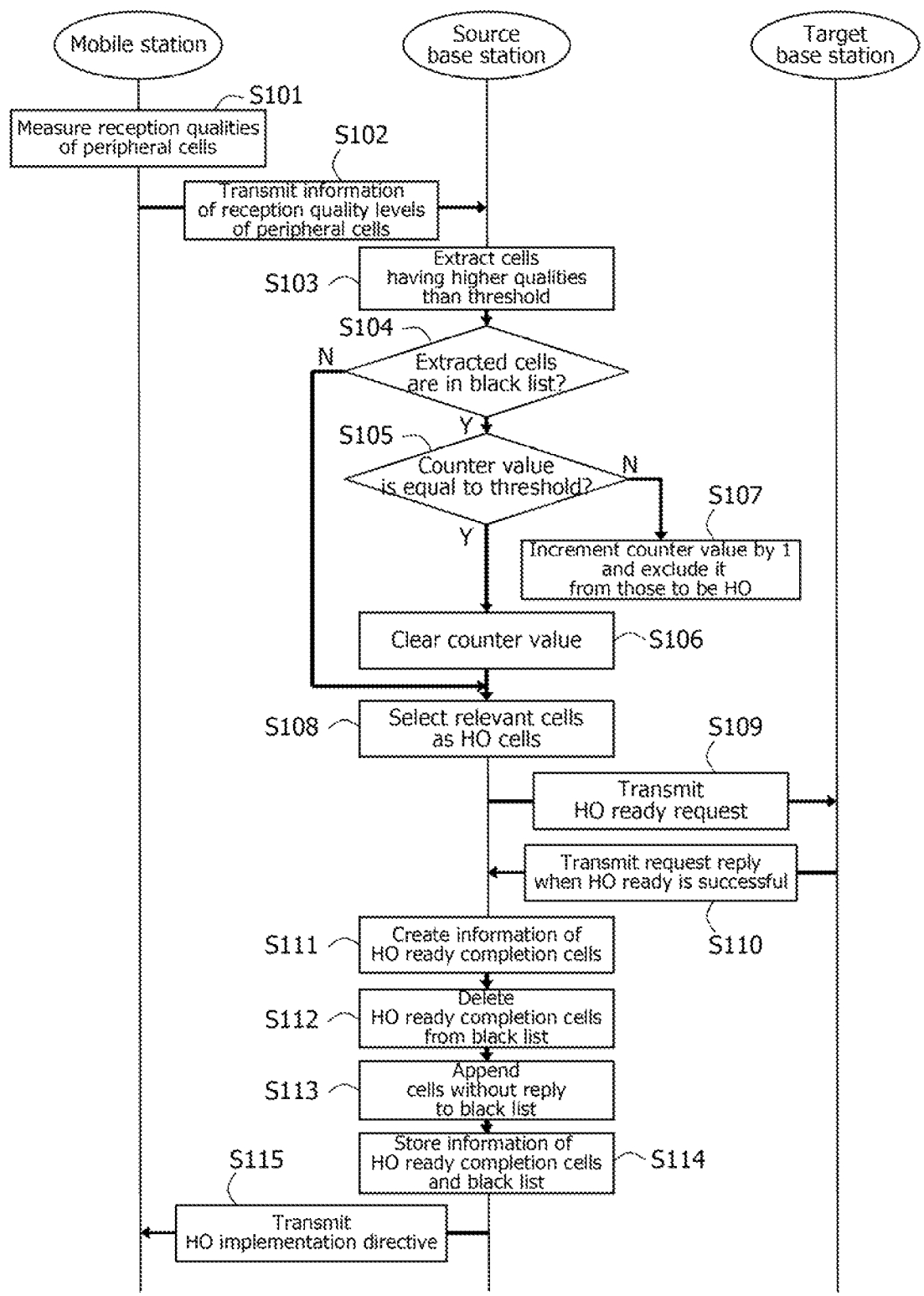
FIG. 4A is a flowchart describing an operation of the mobile communication system shown in FIG. 1.

First, referring to FIG. 4A, mobile station 20 receives pilot signals transmitted from individual peripheral cells of the current source cell and measures the reception qualities (at step S101).

In the event that mobile station 20 detects cells that have higher reception qualities than that of the source cell by a predetermined threshold, mobile station 20 transmits information of reception quality levels of peripheral cells, that includes identifiers of all peripheral cells from which mobile station 20 has received pilot signals and reception quality levels, to a base station (source base station) that manages the source cell (at step S102).

When the source base station receives information of reception quality levels of the peripheral cells from mobile station 20, the source base station extracts cells that have higher reception quality levels than a predetermined threshold from those informed of the information of reception quality levels of the peripheral cells (at step S103) and checks whether or not the identifiers of the extracted cells have been registered in the cell black list (at step S104). The cell black list is a list that has registered information of cells that are not to be handed over. Details will be described later.

When the identifier of a cell extracted at step S103 has been registered in the cell black list at step S104, the source base station checks whether or not the value of a handover ready request avoidance counter is equal to a predetermined threshold (at step S105).

When the value of the handover ready request avoidance counter of the cell extracted at step S103 is equal to the predetermined threshold at step S105, the source base station clears the value of the handover ready request avoidance counter of the cell (at step S106) and selects the cell as a cell that is to be handed over (at step S108).

When the value of the handover ready request avoidance counter of the cell extracted at step S103 is smaller than the predetermined threshold at step S105, the source base station increments the value of the handover ready request avoidance counter of the cell by 1 and excludes the cell from those to be handed over (at step S107).

In contrast, when the identifier of the cell extracted at step S103 has not been registered in the cell black list at step S104, the source base station selects the cell as that to be handed over (at step S108).

In other words, cells registered in the cell black list are not selected as those to be handed over. However, when a predetermined time period elapses and the value of the handover ready request avoidance counter becomes equal to the predetermined threshold, they can be selected as those cells that are to be handed over.

After the source base station selects a group of cells that are to be handed over, the source base station transmits a handover ready request message including information necessary for ready for handover (information of mobile station 20 and wireless resource, and so forth) to the group of peripheral base stations that manage the selected group of cells (at step S109).

When the peripheral base stations receive the handover ready request message from the source base station, after the peripheral base stations have been successfully ready for handover, the peripheral base stations transmit a request reply message to the handover ready request message to the source base station (at step S110).

The source base station creates information of handover ready completion cells based on the request reply message received from the group of peripheral base stations within a predetermined time period (at step S111). In addition, when the identifiers of the handover ready completion cells have been registered in the cell black list, the source base station deletes the identifiers from the cell black list (at step S112).

Moreover, the source base station appends the identifiers of cells, that have not received request reply messages from the group of peripheral base stations within the predetermined time period, to the cell black list (at step S113).

Thereafter, the source base station stores both the information of handover ready completion cells and the cell black list to memory 15 (at step S114) and transmits a handover implementation directive message including the information of handover ready completion cells to mobile station 20 (at step S115).

Figure 4B:
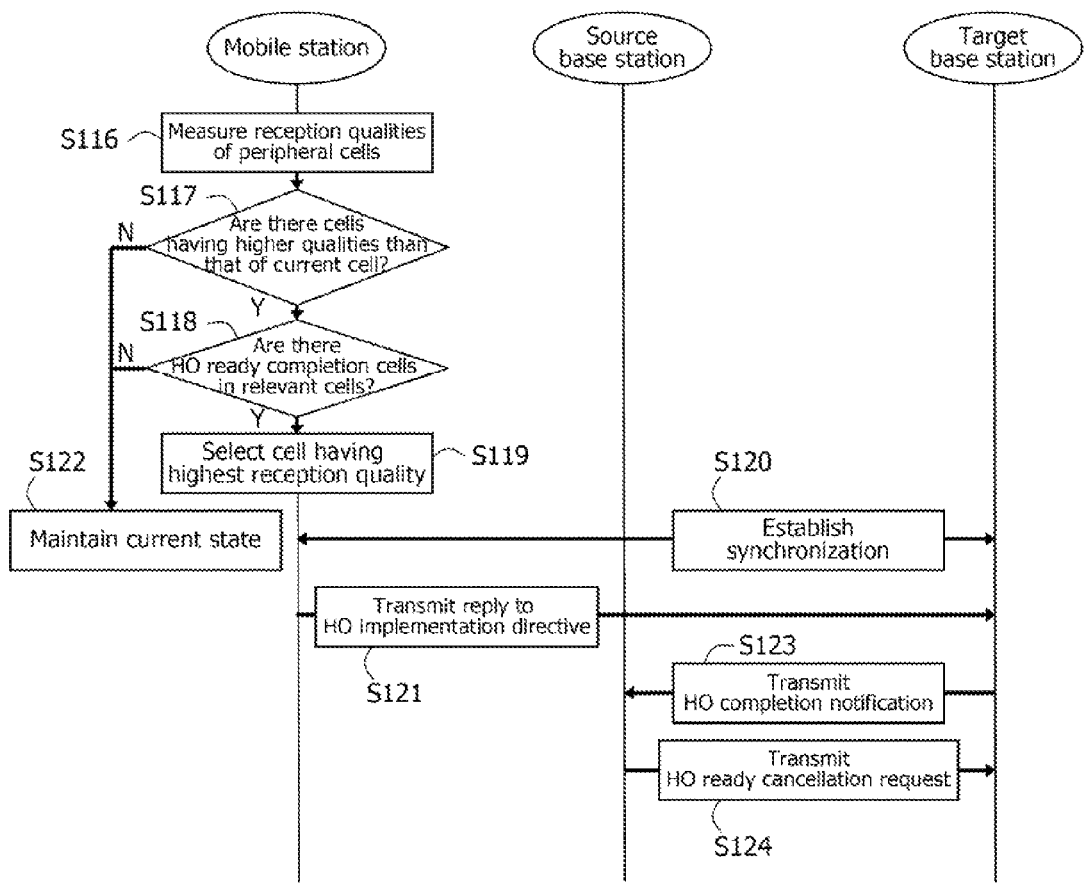
FIG. 4B is a flowchart describing an operation of the mobile communication system shown in FIG. 1.

Thereafter, referring to FIG. 4B, when mobile station 20 receives the handover implementation directive message including the information of handover ready completion cells, mobile station 20 receives pilot signals transmitted from individual peripheral cells of the source cell, measures their reception qualities (at step S116), and checks whether or not there are cells that have higher reception qualities than that of the source cell by a predetermined threshold (at step S117).

When there are cells that have higher reception qualities at step S117, mobile station 20 also checks whether or not there are handover ready completion cells in these cells (at step S118).

When there are handover ready completion cells at step S118, mobile station 20 selects one that has the highest reception quality as a target cell from the handover ready completion cells (at step S119), establishes synchronization with a target base station that manages the selected target cell (at step S120), and transmits a reply message to the handover implementation directive message to the target base station (at step S121).

In contrast, when there are no cells that have higher reception qualities at step S117 or when there are no handover ready completion cells at step S118, mobile station 20 does not perform a handover, but maintains the current state (at step S122).

When the target base station receives the reply message to the handover implementation directive message, the target base station transmits a handover completion notification message to the source base station (at step S123).

In the event that the source base station receives the handover completion notification message from the target base station or when a predetermined timer times out, the source base station transmits a handover ready cancellation request message to the peripheral base stations that manage these handover ready completion cells based on the information of handover ready completion cells (at step S124).

Now, the handover procedure has been completed.

Figure 5:
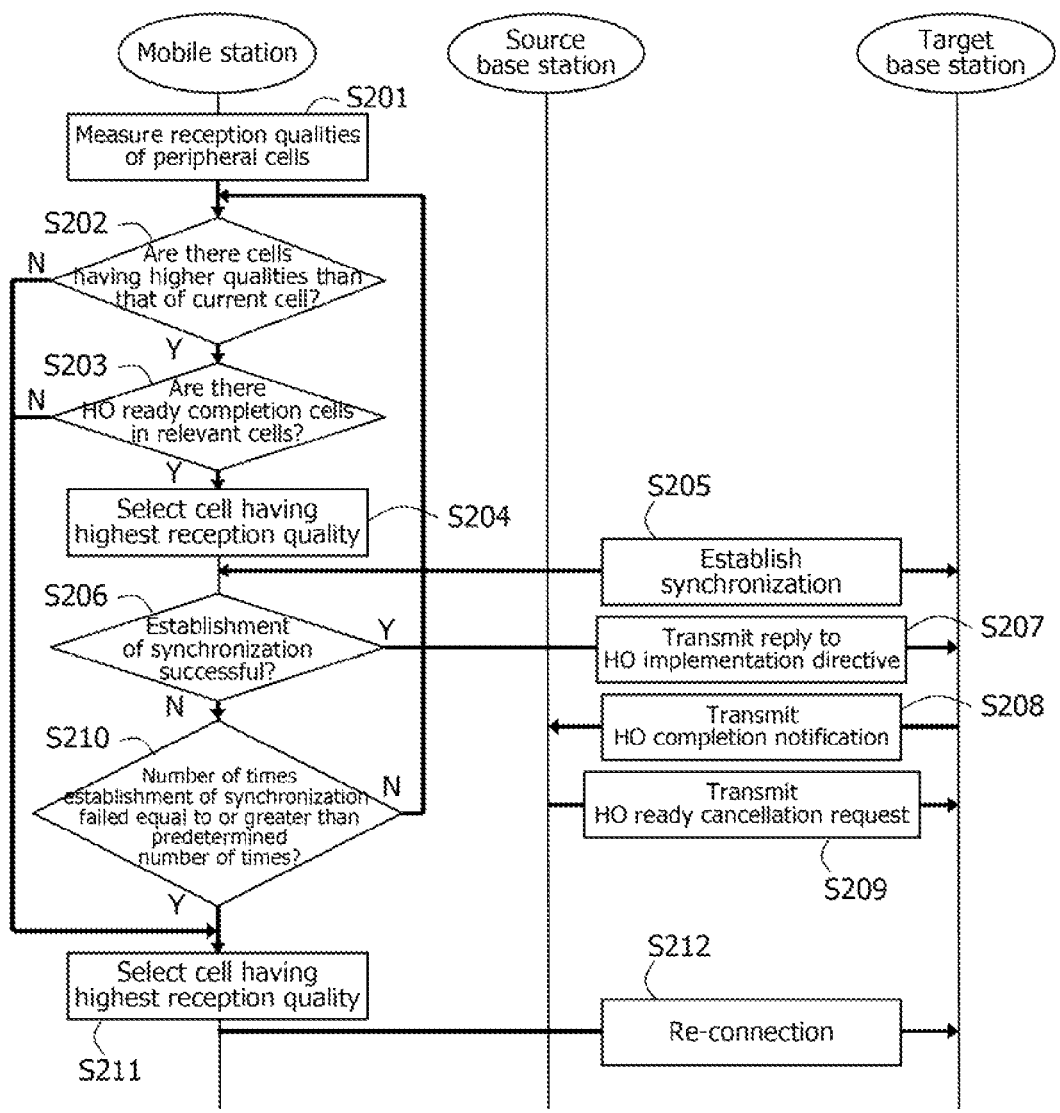
FIG. 5 is a flowchart describing an operation of the mobile communication system shown in FIG. 1.

In FIG. 4B, it is postulated that mobile station 20 successfully establishes synchronization with the target base station. However, it is contemplated that establishment of synchronization fails. Thus, the operation in the case that mobile station 20 fails to establish synchronization with the target base station will be described with reference to FIG. 5. FIG. 5 shows a process performed after the process shown in FIG. 4A.

Referring to FIG. 5, mobile station 20 receives pilot signals transmitted from individual peripheral cells of a source cell, measures their reception qualities (at step S201), and check whether or not there are cells that have higher reception qualities than that of the source cell by a predetermined threshold (at step S202).

When there are cells that have higher reception qualities at step S202, mobile station 20 also checks whether or not there are handover ready completion cells in those cells (at step S203).

When there are handover ready completion cells at step S203, mobile station 20 selects a cell that have the highest reception quality as a target cell in the handover ready completion cells (at step S204) and establishes synchronization with a target base station that manages the selected target cell (at step S205).

In contrast, when there are no cells that have higher reception qualities at step S202 or when there are no handover ready completion cells at step S203, the flow advances to step S211.

Thereafter, mobile station 20 determines whether or not to have succeeded in establishing synchronization with the target base station (at step S206). When establishment of synchronization has succeeded, mobile station 20 transmits a reply message to the handover implementation directive message to the target base station (at step S207).

When the target base station receives the reply message to the handover implementation directive message, the target base station transmits a handover completion notification message to the source base station (at step S208).

In the event that the source base station receives the handover completion notification message from the target base station or when a predetermined timer times out, the source base station transmits a handover ready cancellation request message to the peripheral base stations that manage the handover ready completion cells based on the information of handover ready completion cells (at step S209).

In contrast, when establishment of synchronization fails at step S206, mobile station 20 checks whether or not the number of times that establishment of synchronization has failed exceeds a predetermined number of times (at step S210); when the number of times that establishment of synchronization has failed is smaller than the predetermined number of times, the flow returns to step S202. In contrast, when the number of times establishment of synchronization has failed is equal to or greater than the predetermined number of times at step S210, mobile station 20 gives up handing over, selects a cell that has the highest reception quality in the handover ready completion cells (at step S209), and re-connects base station that manages the selected cell (at step S210).

As described above, when mobile station 20 performs a handover, mobile station 20 selects a target cell that is to be handed over, based on the information of handover ready completion cells that is received from the source base station, and on the information of reception quality levels of individual peripheral cells at that time.

Thus, the case in which the reception quality level of a target cell to which mobile station 20 performs a handover decreases to a level in which mobile station 20 cannot perform a handover, can be prevented from taking place.

In this exemplary embodiment, when mobile station 20 fails to establish synchronization with the selected target cell, mobile station 20 re-selects a target cell that is to be handed over, based on the information of handover ready completion cells that is received from the source base station, and on the information of reception quality levels of individual peripheral cells at that time.

Thus, the case in which the target base station that has been re-selected is not ready for handover can be also prevented from taking place.

In such a manner, since the above-mentioned two cases can be prevented from taking place, the likelihood that a handover will be successfully performed can be increased.

In addition, in this exemplary embodiment, if mobile station 20 fails to establish synchronization with the selected target cells, mobile station 20 selects a target cell, based on the information of handover ready completion cell that is received from the source base station, and on the information of reception quality levels of individual peripheral cells at that time or gives up handing over and re-connects a cell that has the highest reception quality level at that time.

Thus, after establishment of synchronization with a target cell has failed, a delay of connection due to exchanges of unnecessary signals and congestion in a base station imposing an increased load thereon can be prevented.

Now, with reference to the exemplary embodiments, the present invention has been described. However, it should be understood by those skilled in the art that the structure and details of the present invention may be changed in various manners without departing from the scope of the present invention.

The present application is the National Phase of PCT/JP2009/054750, filed Mar. 12, 2009, which claims a priority based on Japanese Patent Application JP 2008-130539 filed on May 19, 2008, the entire contents of which being incorporated herein by reference in its entirely.

The invention claimed is:

1. A mobile communication system having a base station that manages a cell; and a mobile station that performs a handover from a source cell to a target cell as said mobile station moves, characterized in that said mobile station measures reception quality levels of individual peripheral cells of said source cell and transmits information of the measured reception quality levels of the individual peripheral cells to a source base station that manages said source cell, said source base station selects a group of cells that are to be handed over, based on the information of reception quality levels of the individual peripheral cells that is received from said mobile station, and transmits information of handover ready completion cells that are ready for handover in the selected group of cells to said mobile station, and said mobile station selects a target cell that is to be handed over, based on the information of handover ready completion cells that is received from said source base station, and on the information of reception quality levels of the individual peripheral cells at that time, wherein said source base station selects a group of cells that are to be handed over, based on the information of reception quality levels of the individual peripheral cells that is received from said mobile station, and on the information of cells registered in a cell black list, transmits a handover ready request message to a group of peripheral base stations that manage the selected group of cells, and creates information of handover ready completion cells based on a request positive reply message, that is received from said group of peripheral base stations, to the handover ready request message, said source base station registers information of cells that have not received said request positive reply message from said group of peripheral base stations in said cell black list, and said source base station deletes information of cells from said cell black list if the information of cells that have received said request positive reply message from said group of peripheral base stations has been registered in said cell black list, wherein, for a cell for which information is registered in said cell black list, a value of a handover ready request avoidance counter is checked, and if the value of the handover ready request avoidance counter is equal to a threshold value, the value of the handover ready request avoidance counter for the cell is cleared and the cell is selected as a cell to be handed over, and if the value of the handover ready request avoidance counter is less than the threshold value, the value of the handover ready request avoidance counter for the cell is incremented and the cell is excluded from the cells to be handed over.

2. The mobile communication system as set forth in claim 1, characterized in that said mobile station re-selects a target cell that is to be handed over, based on the information of handover ready completion cells that is received from said source base station, and the information of reception quality levels of the individual peripheral cells at that time if establishment of synchronization with said selected target cell has failed.

3. The mobile communication system as set forth in claim 1, characterized in that said mobile station gives up handing over to said target cell and re-connects a cell that has the highest reception quality level at that time, based on the information of handover ready completion cells that is received from said source base station, and on the information of reception quality levels of the individual peripheral cells at that time if establishment of synchronization with said selected target cell has failed.

4. A base station that manages a source cell when a mobile station performs a handover from said source cell to a target cell as said mobile station moves, characterized by comprising:

a handover processing unit that selects a group of cells that are to be handed over, based on information of reception quality levels of individual peripheral cells of said source cell, that is received from said mobile station, and transmits information of handover ready completion cells that are ready for handover in the selected group of cells to said mobile station, wherein said handover processing unit selects a group of cells that are to be handed over, based on the information of reception quality levels of the individual peripheral cells, the information having been received from said mobile station, and on the information of cells registered in a cell black list, transmits a handover ready request message to a group of peripheral base stations that manage the selected group of cells, and creates information of handover ready completion cells based on a request positive reply message, that is received from said group of peripheral base stations, to the handover ready request message, said handover processing unit registers information of cells that have not received said request positive reply message from said group of peripheral base stations in said cell black list, and said handover processing unit deletes information of cells from said cell black list if the information of cells that have received said request positive reply message from said group of peripheral base stations has been registered in said cell black list, wherein, for a cell for which information is registered in said cell black list, a value of a handover ready request avoidance counter is checked, and if the value of the handover ready request avoidance counter is equal to a threshold value, the value of the handover ready request avoidance counter for the cell is cleared and the cell is selected as a cell to be handed over, and if the value of the handover ready request avoidance counter is less than the threshold value, the value of the handover ready request avoidance counter for the cell is incremented and the cell is excluded from the cells to be handed over.

5. A handover controlling method performed by a base station that manages a source cell when a mobile station performs a handover from said source cell to a target cell as said mobile station moves, characterized by comprising:

a first step that selects a group of cells that are to be handed over, based on information of reception quality levels of individual peripheral cells of said source cell, that is received from said mobile station; and a second step that transmits information of handover ready completion cells that are ready for handover in the selected group of cells to said mobile station, wherein said first step selects a group of cells that are to be handed over, based on the information of reception quality levels of the individual peripheral cells that is received from said mobile station, and on the information of cells registered in a cell black list, said second step transmits a handover ready request message to a group of peripheral base stations that manage said selected group of cells and creates information of handover ready completion cells based on a request positive reply message, that is received from said group of peripheral base stations, to the handover ready request message, said second step registers information of cells that have not received said request positive reply message from said group of peripheral base stations in said cell black list, and said second step deletes information of cells from said cell black list if the information of cells that have received said request positive reply message from said group of peripheral base stations has been registered in said cell black list, wherein, for a cell for which information is registered in said cell black list, a value of a handover ready request avoidance counter is checked, and if the value of the handover ready request avoidance counter is equal to a threshold value, the value of the handover ready request avoidance counter for the cell is cleared and the cell is selected as a cell to be handed over, and if the value of the handover ready request avoidance counter is less than the threshold value, the value of the handover ready request avoidance counter for the cell is incremented and the cell is excluded from the cells to be handed over.

* * * * *